P. VAN WIENEN.
SUCTION AND PRESSURE DREDGER.
APPLICATION FILED JULY 19, 1910.

1,038,049.

Patented Sept. 10, 1912.

2 SHEETS—SHEET 1.

WITNESSES

INVENTOR

P. VAN WIENEN.
SUCTION AND PRESSURE DREDGER.
APPLICATION FILED JULY 19, 1910.

1,038,049.

Patented Sept. 10, 1912.

2 SHEETS—SHEET 2.

WITNESSES

INVENTOR

UNITED STATES PATENT OFFICE.

PIETER van WIENEN, OF COLOGNE, GERMANY.

SUCTION AND PRESSURE DREDGER.

1,038,049. Specification of Letters Patent. Patented Sept. 10, 1912.

Application filed July 19, 1910. Serial No. 572,665.

*To all whom it may concern:*

Be it known that I, PIETER VAN WIENEN, engineer, citizen of the Empire of Germany, residing at 42 Gereonstrasse, Cologne, Germany, have invented new and useful Improvements in Suction and Pressure Dredgers, of which the following is a specification.

This invention relates to improvements in dredging heads and is more especially adapted to devices of this character used in connection with suction dredges.

One of the objects of the invention is to provide a device possessing a plurality of suction apertures positioned at an angle with one another.

Another object is to provide a device which will be efficient in operation, comparatively simple in manufacture, and which is adapted for use under practically any and all conditions.

Other objects will be in part obvious and in part pointed out hereinafter.

Figure 1:
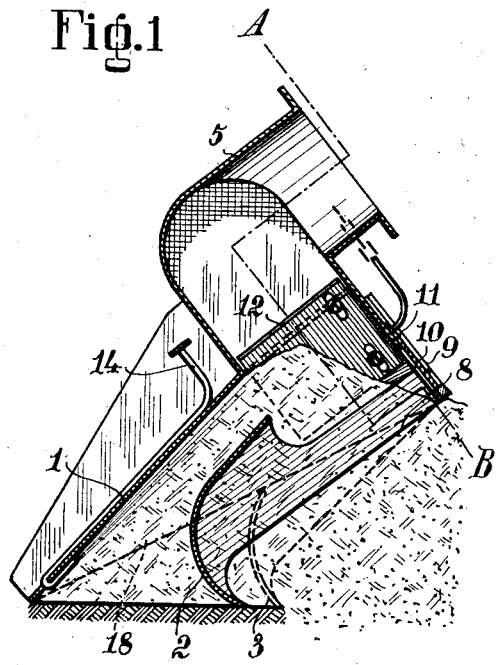
Figure 2:
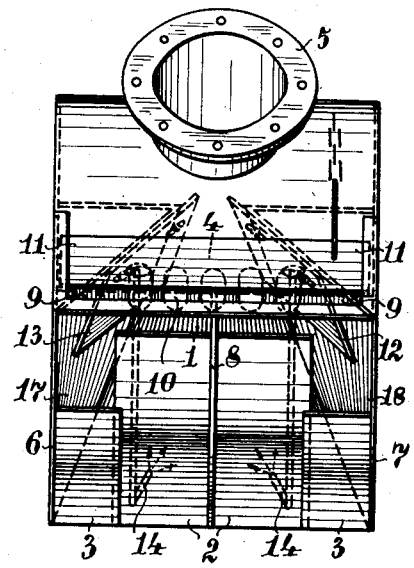
Figure 3:
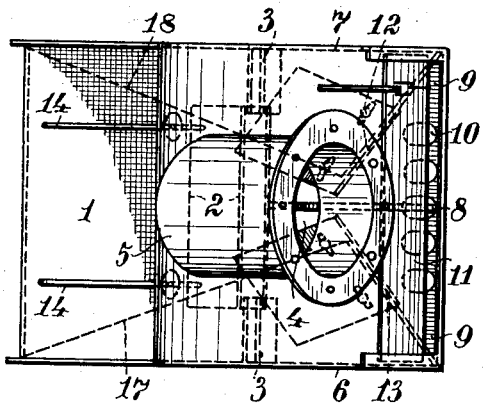
Figure 4:
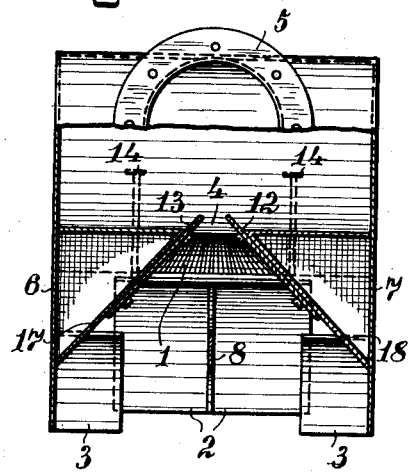
Figure 5:
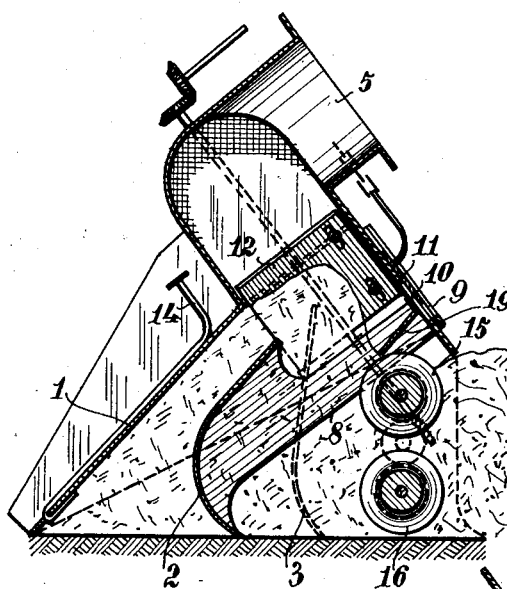
Figure 6:
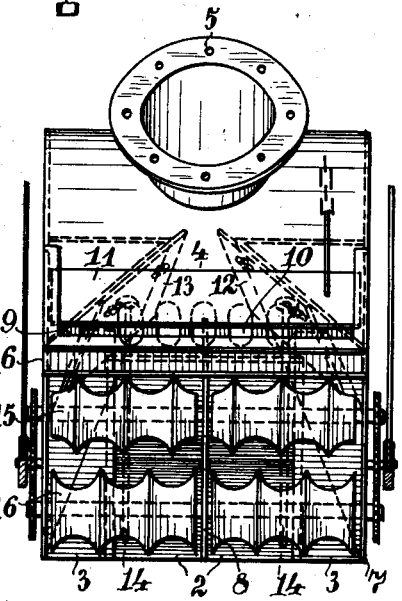
Figure 7:
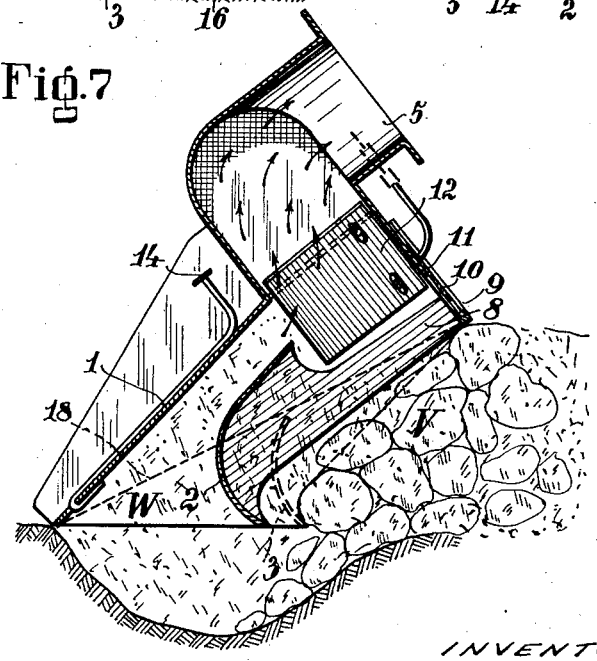

In the accompanying drawings showing the illustrative embodiments of the invention, and in which the same reference character refers to similar parts in the several figures; Figure 1 is a vertical sectional view of the dredger-head. Fig. 2 is a front elevational view of the device. Fig. 3 is a plan view. Fig. 4 is a sectional view taken on the line A—B of Fig. 1. Fig. 5 is a view similar to Fig. 1 showing a slightly modified form. Fig. 6 is a front view of the device shown in Fig. 5. Fig. 7 is a view similar to Fig. 1 illustrating the operation of the device when the front opening becomes stopped up.

Referring to the figures, the dredger-head is shown as comprising a rear wall 1, which is preferably inclined at an angle of about 45 degrees from the horizontal, two side walls 6 and 7 extending forwardly from the rear wall, and an upper or front wall consisting of a plate 9 which is preferably provided with slits 10. These slits may be opened or closed by means of a sliding plate 11, which is provided with slits corresponding to the slits in the plate 9 and adapted to be moved into and out of registry therewith. A plurality of cutting tools 2 and 3 are provided, the tools 2 being preferably positioned between and in the rear of the tools 3. These tools are spoon-shaped and, as clearly shown, present their concave surfaces toward the material which is to be operated upon. The cutting tools 3 are preferably secured to and supported by the side walls 6 and 7 while the cutting tools 2 are maintained in position and supported by an intermediate wall 8, which is substantially parallel with the side walls 6 and 7.

As clearly shown in Fig. 1, the cutting tools 2 are so formed and spaced from the rear and front wall of the dredger-head that a space is provided between the tools and the rear wall which communicates with an opening at the bottom of the head, and a space is also provided between the upper edges of the tools 2 and the upper or front wall 9, thereby forming an opening in the front of the head through which the material is adapted to be drawn. Rearwardly extending inclined walls 17 and 18 are preferably provided for narrowing the suction of aperture 4, and in order to vary the size of this aperture, these inclined plates are provided with plates 12 and 13 which are movably mounted thereon in any suitable manner, as, for example, by means of slits with which screws or pins are adapted to engage. Both the bottom and front openings of the dredger-head are in communication with the suction pipe 5, which in turn, communicates with the apparatus on the float or dredger.

The operation of the device, which should be largely obvious from the above description, is as follows: As the dredger-head is moved forward in the usual manner, the material to be excavated is engaged by the forward edges of the walls 6, 7 and 9 and by the spoon-shaped cutting tools 2 and 3, and is so divided that it is forced upward into the space between the inclined walls and the tools toward the front opening. The space in the rear of the cutting tools and in front of the rear wall 1, also becomes filled with earth, which is in a finer state than that which is in front of the cutting tools and which passes through the bottom opening. The relative arrangement of the various parts forces the earth upward and into the suction aperture 4, from which it will be drawn up through the suction pipe 5 in the usual manner. If the material to be operated upon is stony or coarse granular earth, reducing rollers 15 and 16 of any suitable construction are preferably provided, being positioned in front of the cutting tools 2 and 3, as shown in Figs. 5 and 6. These rollers may be operated from the float in any suitable manner, as, for example, by the gearing shown in the figures.

Fig. 7 indicates the operation of the device when the front opening has become stopped up, as, for example, by stones. When this occurs the suction will take place through the bottom opening only, thereby forming a hollow below the dredger-head, as indicated in the figure, into which hollow the obstructing material will drop, thus leaving the front opening in operative condition. This obviates the necessity of raising the head from the deck of the float when obstructions are met with.

When the material to be operated upon is in the nature of clay, loam, etc., it is advantageous to convert it into a pulp or semi-liquid condition. This may be accomplished by moving the slide 11, as, for example, by means of a chain secured thereto and extending to the float in such a manner that the openings therein will register with the openings in the plate 9, thereby allowing the water to pass through the openings in the plate 9 and spread over the upper surface of the material, which is immediately in front of the front suction opening. The suction action is furthermore assisted by causing compressed air or water under pressure to act through pipe 14 upon the material which is located between the cutting tools and the rear wall 1.

While, by way of illustration, but one dredger-head is shown, it will, of course, be understood that, if desired, a number of them may be arranged side by side.

Having described this invention in connection with the illustrative embodiments thereof, to the details of which disclosure the invention is not, of course, to be limited, what is claimed as new and what is desired to be secured by Letters Patent is set forth in the appended claims:

1. In a dredging head, in combination, a body portion provided with a plurality of openings, the planes of said openings being disposed at an angle to one another, one of said openings being in the front of the dredging head and the other of said openings being in the bottom thereof, cutting tools positioned within said head and dividing the same into front and rear compartments, the rear compartment communicating with the bottom opening and the front compartment communicating with the front opening, and a suction pipe communicating with both of said compartments.

2. In a dredging head, in combination, a body portion provided with a plurality of openings, the planes of said openings being disposed at an angle to one another, one of said openings being in the front of the dredging head and the other of said openings being in the bottom thereof, cutting tools positioned within said head and dividing the same into front and rear compartments, the rear compartment communicating with the bottom opening and the front compartment communicating with the front opening, a suction pipe communicating with both of said compartments, and a pipe for conveying fluid under pressure into the rear compartment, said pipe being so positioned that the fluid under pressure will assist the suction, thereby accelerating the motion of the material acted upon.

3. In a dredging-head, in combination, a body portion comprising side walls, and a rear wall, cutting tools positioned between said side walls and spaced from said rear walls whereby a passage is formed between the cutting tools and the rear wall, and an upper wall spaced from the upper end of said cutting tools whereby a passage is formed between said cutting tools and said upper wall, and a suction pipe communicating with both of said passages.

In testimony whereof I have signed my name to this specification in the presence of two subscribing witnesses.

PIETER van WIENEN.

Witnesses:
 OSCAR DEPNER,
 HANS WEBER.

Copies of this patent may be obtained for five cents each, by addressing the "Commissioner of Patents, Washington, D. C."